US 9,434,012 B2

(12) United States Patent
Micali et al.

(10) Patent No.: US 9,434,012 B2
(45) Date of Patent: Sep. 6, 2016

(54) CUTTING-OFF MACHINE

(71) Applicant: FIVES OTO S.P.A., Boretto (RE) (IT)

(72) Inventors: Luciano Micali, Guastalla (IT);
Andrea Anesi, S.Ilario D'Enza (IT);
Aleardo Chezzi, Boretto (IT);
Gianluca Vecchini, Parma (IT)

(73) Assignee: FIVES OTO S.P.A., Boretto (IT)

( * ) Notice: Subject to any disclaimer, the term of this patent is extended or adjusted under 35 U.S.C. 154(b) by 133 days.

(21) Appl. No.: 14/558,343

(22) Filed: Dec. 2, 2014

(65) Prior Publication Data

US 2015/0158099 A1 Jun. 11, 2015

(30) Foreign Application Priority Data

Dec. 6, 2013 (IT) .............................. MO2013A0332

(51) Int. Cl.
| | |
|---|---|
| *B23D 21/04* | (2006.01) |
| *B23D 79/02* | (2006.01) |
| *B21C 37/08* | (2006.01) |
| *B23D 25/04* | (2006.01) |
| *B23K 26/08* | (2014.01) |
| *B23K 26/38* | (2014.01) |
| *B23K 31/02* | (2006.01) |
| *B23K 26/10* | (2006.01) |

(52) U.S. Cl.
CPC ........... *B23D 21/04* (2013.01); *B21C 37/0807* (2013.01); *B21C 37/0811* (2013.01); *B23D 25/04* (2013.01); *B23D 79/023* (2013.01); *B23K 26/0846* (2013.01); *B23K 26/38* (2013.01); *B23K 31/027* (2013.01); *B23K 26/103* (2013.01); *B23K 2201/06* (2013.01); *Y10T 82/16* (2015.01); *Y10T 83/0524* (2015.04); *Y10T 83/6476* (2015.04)

(58) Field of Classification Search
CPC .... B23D 21/04; B23D 25/04; B23D 79/023; B23K 26/0846; B23K 26/38; B23K 31/027; B23K 26/103; B23K 2201/06; B21C 37/0807; B21C 37/0811; Y10T 83/0524; Y10T 82/16; Y10T 83/6476
USPC ....... 83/27, 42, 52, 54, 284, 298, 307.2, 318
See application file for complete search history.

(56) References Cited

U.S. PATENT DOCUMENTS 3,370,491 A * 2/1968 Cross .................... B26F 1/0023
29/896.6
3,630,126 A * 12/1971 Ronai ...................... B26D 1/60
493/11

(Continued)

FOREIGN PATENT DOCUMENTS

| DE | 41 17 574 C1 | 7/1992 |
|---|---|---|
| EP | 0 384 721 A1 | 8/1990 |

(Continued)

*Primary Examiner* — Sean Michalski
(74) *Attorney, Agent, or Firm* — Pearne & Gordon LLP (57) ABSTRACT

A cutting-off machine, comprising a cutting unit (2) being enabled to receive a tube (100) and to cut the tube (100) according to a plane transversal to a longitudinal axis (X) of the tube (100), movement means (8) enabled to grip stably a length (S) of cut tube (100) and move said length (S) away from the cutting unit (2) along a direction of advance (A) of the tube (100), and a cutting-off device (5) interposed between said cutting unit (2) and said movement means (8) and configured to realise cutting off of an inner welding seam (200) floating inside said tube (100).

10 Claims, 5 Drawing Sheets

(56) References Cited

U.S. PATENT DOCUMENTS

| | | | | |
|---|---|---|---|---|
| 3,924,502 A * | 12/1975 | Borzym | ............... | B23D 21/00 83/319 |
| 4,084,463 A | 4/1978 | Kanbara et al. | | |
| 4,337,680 A * | 7/1982 | Borzym | ............... | B23D 21/00 83/319 |
| 4,457,200 A * | 7/1984 | Borzym | ............... | B23D 21/00 83/319 |
| 4,919,025 A * | 4/1990 | Snyder | ............... | B23D 21/00 83/236 |
| 5,063,798 A | 11/1991 | Kitaoka et al. | | |
| 5,161,444 A | 11/1992 | Kusakabe et al. | | |
| 5,964,137 A * | 10/1999 | Jung | ............... | B23D 21/02 83/54 |
| 6,009,780 A * | 1/2000 | Savioli | ............... | B23D 21/04 82/53.1 |
| 6,260,395 B1 * | 7/2001 | Webster | ............... | B21D 7/024 72/149 |
| 6,439,089 B1 * | 8/2002 | Fasske | ............... | B23D 23/00 83/13 |
| 9,211,599 B2 * | 12/2015 | Farina | ............... | B21D 31/043 |
| 2004/0099109 A1 | 5/2004 | Dunlap et al. | | |
| 2005/0163882 A1 | 7/2005 | Dunlap et al. | | |
| 2005/0181159 A1 | 8/2005 | Dunlap et al. | | |
| 2008/0202299 A1 | 8/2008 | Kudrus | | |
| 2010/0180736 A1 * | 7/2010 | Tabanelli | ............... | B23D 45/10 83/37 |
| 2011/0173786 A1 * | 7/2011 | Moshfegh | ............... | B26D 1/10 29/2.15 |
| 2013/0340257 A1 * | 12/2013 | Nasiell | ............... | B23D 21/04 30/97 |
| 2015/0082954 A1 * | 3/2015 | Anesi | ............... | B23D 25/04 83/38 |
| 2015/0090083 A1 * | 4/2015 | Conrad | ............... | B23B 5/08 82/47 |
| 2015/0367420 A1 * | 12/2015 | Williamson | ............... | B23B 5/14 82/47 |

FOREIGN PATENT DOCUMENTS

| | | |
|---|---|---|
| EP | 2 404 691 A1 | 1/2012 |
| JP | S59 81015 A | 5/1984 |

\* cited by examiner

Fig. 1

CUTTING-OFF MACHINE

The present invention relates to a cutting-off machine, in particular a machine adapted to cutting a continuous tube into lengths of tube, wherein the continuous tube is realised by means of longitudinal welding of a bent metal sheet.

In the sector of production of welded tubes by means of longitudinal welding, the formation of an inner seam is known, i.e. extending inside the tube, as a consequence of removing the outer welding seam ("detachment") of said tube. In fact, detachment is performed immediately downstream of the welding by means of a hooked tool which removes the outer seam in a longitudinal direction, generating pressures which promote creation of an inner welding seam.

The inner seam is also removed immediately downstream of the longitudinal welding of the continuous tube and forms a continuous seam which is trapped inside the tube, also subsequent to cutting of said tube. Cutting of the continuous tube is, in fact, realised with special cutting-off machines (for example, orbital cutting machines), the cutting tools of which remain on the periphery of the tube and do not damage the continuous inner seam.

The aforementioned inner seam, which is continuous, does not allow correct offloading of the cut tubes, so it must be cut off.

In the prior art, it is known to provide a device for cutting off the inner seam downstream of the cutting-off machine (i.e. the machine adapted to cut the continuous welded tube into lengths of tube) and therefore operates after the single tubes have already been released by the cutting-off machine. This is achieved by accelerating the tube just cut-off (which travels on a bed of motorised rollers), distancing it from the remaining part of the continuous tube, and therefore from the cutting-off machine, so as to leave exposed a section of the aforementioned continuous inner seam.

Once the cut-off tube has been distanced from the cutting-off machine and a section of the continuous inner seam is therefore exposed, a cutting blade is activated which cuts the seam.

The functioning and safety of the system are guaranteed by the presence of barrier photocells positioned both before and after the seam cutting blade. In particular, the photocells upstream serve not to enable movement of the blade if the tube is too close to the cutting-off zone and therefore avoid impacts.

The safety photocells are necessary since the tube is no longer on the cutting-off machine and, due to sliding/swaying of the tube on the roller bed, it is no longer possible to know precisely the position of the various tubes present on said roller bed.

This solution currently has various drawbacks.

In the first place, the length of the exposed section of the continuous inner seam at the moment of cutting depends on the distance travelled by the cut tube which is advancing on the roller bed and said distance, which cannot be controlled as the movement of the tube on the roller bed cannot be controlled, may also be considerable. Consequently, cutting of the seam may produce very long overhanging seam ends, which could accidentally become trapped between the rollers of the roller bed, slow down the tube to be offloaded, send false signals to the photocells, damage cables/tubes present on the machine and cause other related problems.

Furthermore, the photocell signals are not always reliable due to fumes, dirt, swaying movements of the tubes and other related causes. This may lead to non-functioning of the cutting blade or non-optimal or irregular functioning, and consequently non-separation of the seam.

The object of the present invention is therefore to provide a cutting-off machine which obviates the drawbacks of the prior art as cited above.

In particular, an object of the present invention is to provide a cutting-off machine which is highly reliable and safe.

The specified object is fully achieved by a cutting-off machine according to the present invention, which is characterised by what is contained in the claims set forth below.

The technical characteristics of the invention, according to the aforementioned object, can be clearly seen from the contents of the claims set forth below, and the advantages thereof will more fully emerge from the detailed description which follows, made with reference to the accompanying drawings, which represent a purely exemplary and non-limiting embodiment thereof, wherein

Within the scope of the present invention the term "cutting-off" is intended as the complete separation of a length of continuous tube or one much longer than said length. Said cutting-off is the sum of a first cutting operation, performed on the tube to separate the tube length, and a subsequent cutting operation of the floating inner seam (i.e. free as previously separated from the tube by means of a special inner detaching tool) inside the tube.

Furthermore, the invention is aimed at cutting tubes of any cross-section, obtained by means of welding a metal sheet along a longitudinal welding line, and operates preferably downstream of a removal unit of the outer welding seam.

Figure 1:
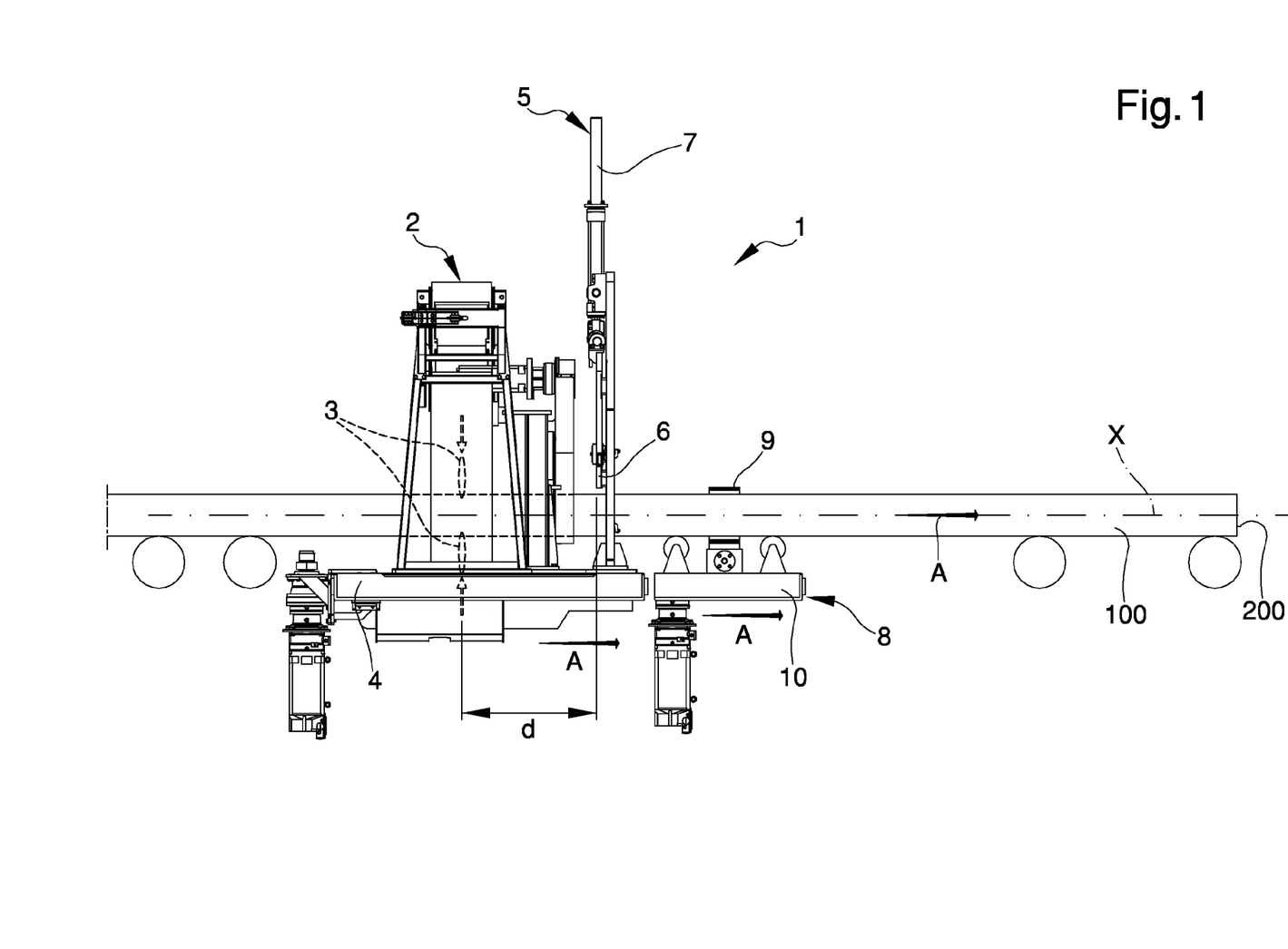
FIGS. 1-5 show a side view of the cutting-off machine according to the invention, in accordance with a sequence of operating steps in succession.

FIG. 1 shows a cutting-off machine according to the present invention, which is adapted to operate the cut of a tube 100 which is made to advance along its own longitudinal axis "X" according to a direction of advance "A", for example by means of a roller bed or other guide means and support adapted to the purpose. Preferably, the rollers rotate around respective horizontal axes and have a double-cone shape ("hour-glass" shape), with reduced central diameter to realise a support and guide of the tube 100.

The cutting-off machine 1 comprises, in the first place, a cutting unit 1 adapted to receive a tube 100 and to cut the tube 100 on a transversal or perpendicular plane to the longitudinal axis "X" of the tube 100, in particular on a vertical plane, in order to obtain a length "S" of tube separate from the remaining part of the tube 100.

Preferably, the cutting unit 2 is the orbital cutting type, i.e. having at least one or more cutting tools (not shown as known in themselves) mobile along a circular trajectory or curve which extends around the longitudinal axis "X" of the tube 100. FIGS. 1-5 show, in an entirely exemplary and diagrammatic way, two opposing tools 3 in the shape of circular blades, equipped with a rotary movement of revolution around the longitudinal axis "X" of the tube 100 and approach and radial distancing with respect to the tube 100. It is nonetheless possible to use other cutting tools, such as laser, water, plasma, etc., cutting heads.

Alternatively, it is possible to use other types of cutting unit 2, for example one or more linear advance blades.

The cutting unit 2 cuts the tube 100 along a cutting line resting on a vertical plane, preferably perpendicular, to the longitudinal axis "X" of the tube 100. Said plane is preferably vertical.

The cutting unit 2 is mobile along a parallel direction to the longitudinal axis "X" of the tube 100 to operate with a technique of following the tube 100. In other words, the cutting unit 2 is mobile in a sliding way (for example on a trolley 4 or another structure adapted to the purpose) parallel to the longitudinal axis "X" of the tube advancing parallel to said advance direction "A" of the tube 100 and backwards according to an opposite direction "R". Thus, the cutting unit 2 may move at the same advance speed of the tube 100 for a time at least sufficient to complete cutting of the tube 100 and, subsequently, may be brought backwards to operate a new cut on a subsequent part of the tube 100. The above may be summarised by stating that the cutting unit 2 is mobile in a sliding way forwards and backwards between a first position, more upstream with respect to the advance direction "A" and visible, for example, in FIG. 1, with which a starting position of cutting of the tube 100 corresponds, and a second position, more downstream with respect to the advance direction "A" and visible, for example, in FIG. 4, with which a completed cutting position of the tube 100 corresponds. The operations necessary to complete cutting of the tube 100 will be described below in more detail. Immediately downstream of the cutting unit 2 a cutting-off device 5 is arranged, configured to cut the inner welding seam 200 floating inside the tube 100 and which is partially exposed after one length "S" of tube, separated from the remaining part of the tube 100, is distanced from said remaining part of the tube 100 by means of acceleration of the length "S". The cutting-off device 5 comprises a blade 6 mobile according to a respective transversal plane, preferably perpendicular, to the longitudinal axis "X" of the tube 100 under the action of an actuator 7. Preferably, the blade 6 acts on a respective vertical plane according to a guillotine movement.

The cutting-off device 5 is also mobile along a parallel direction to the longitudinal axis "X" of the tube 100 to operate with a technique of following on the tube 100. In a like way to the cutting unit 2, the cutting-off device 5 is mobile in a sliding way parallel to the longitudinal axis "X" of the tube 100 advancing parallel to said advance direction "A" of the tube 100 and backwards according to an opposite direction "R". Thus, the cutting-off device 5 may move at the same advance speed as the tube 100 for a time at least sufficient to complete cutting of the inner seam 200 and, subsequently, may be brought backwards to operate a new cut on a subsequent part of the inner seam 200. The above may be summarised by stating that the cutting-off device 2 is mobile in a sliding way forwards and backwards between a first position, more upstream with respect to the advance direction "A" and visible, for example, in FIG. 1, with which a starting position of cutting of the tube 100 corresponds, and a second position, more downstream with respect to the advance direction "A" and visible, for example, in FIG. 4, with which a completed cutting position of the tube 100 corresponds.

According to a preferred embodiment of the invention, the cutting unit 2 and the cutting-off device 5 are solidly joined in the forward/backward movement "A", "R" along the longitudinal axis "X" of the tube 100. For this purpose, the cutting unit 2 and the cutting-off device 5 may be arranged on the same trolley 4 which moves forwards and backwards along the longitudinal axis "X" of the tube 100 between said first and second position.

Figure 3:
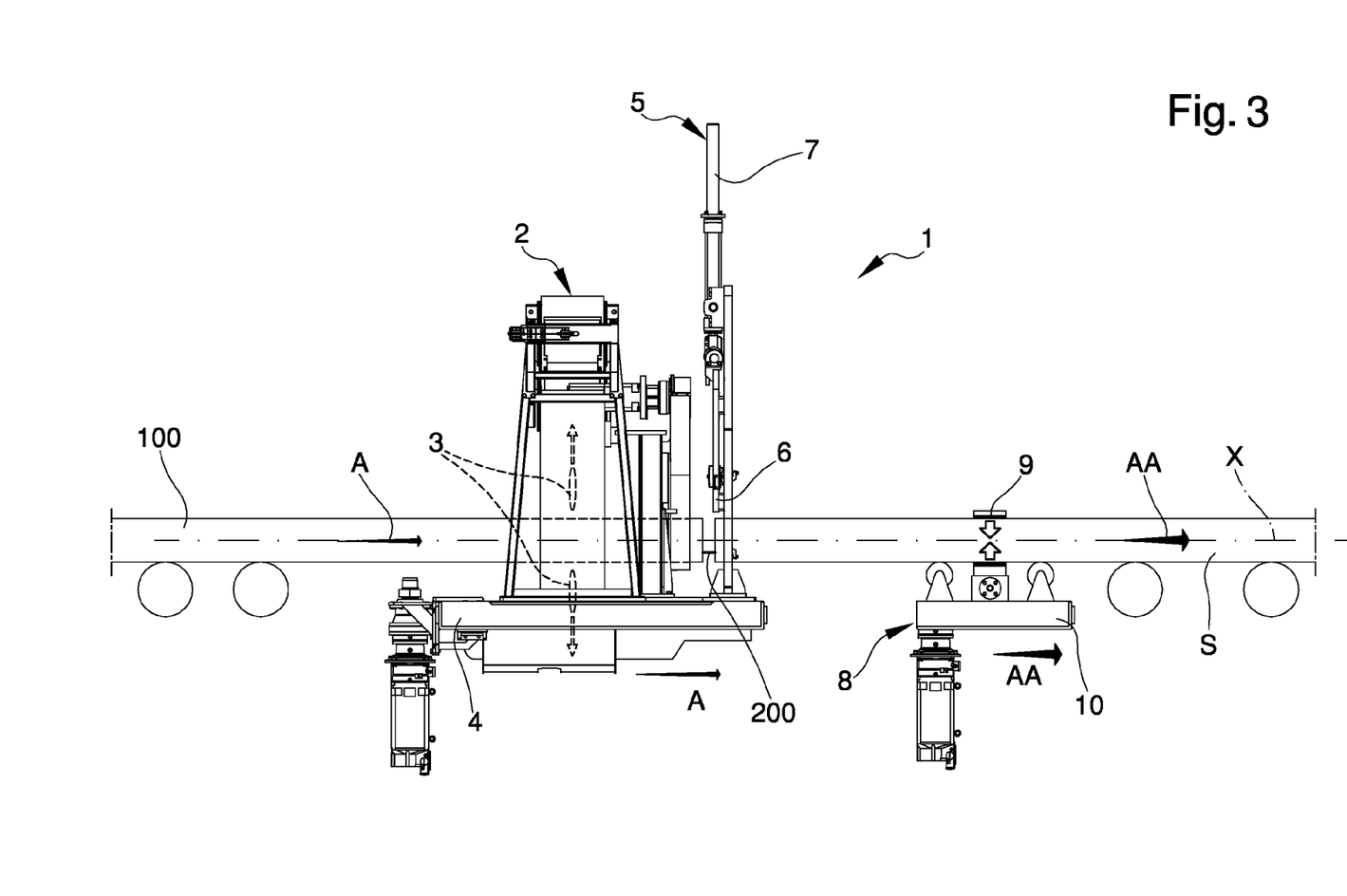

The cutting-off machine 1 further comprises movement means 8 adapted to grip stably a length "S" of tube 100 previously cut and to distance the length "S" from the cutting unit 2 along an advance direction "A" of the tube 100. In other words, the movement means 8 grip the length "S" of the tube 100 just cut by the cutting unit 2 and accelerate it along an advance direction "A", so as to distance the length "S" from the remaining part of the tube 100, thus exposing a section of the inner seam 200 (FIG. 3).

In the embodiment shown, the movement means 8 comprise a grip 9, preferably a roller grip, mounted sliding on a respective trolley 10 mobile forwards and backwards along the longitudinal axis "X" of the tube 100. The movement means 8 could be realised in another way, provided they are adapted to the purpose of gripping the length "S" and distancing it from the remaining portion of the tube 100 to expose a section of the inner seam 200.

Figure 4:
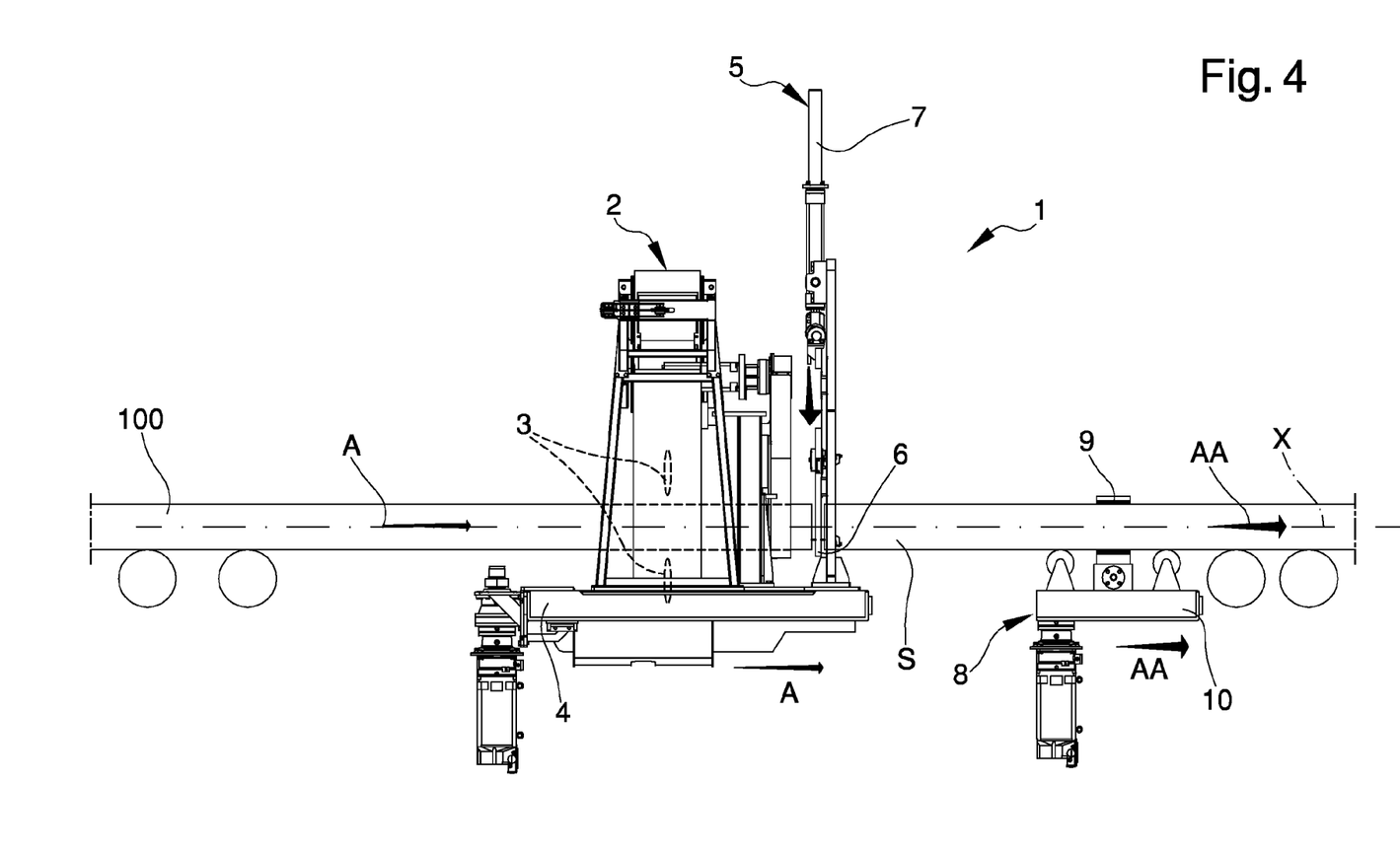

The movement means 8 are mobile in a sliding way forwards and backwards between a first position, more upstream with respect to the advance direction "A" and visible, for example, in FIG. 1, with which a starting position of cutting of the tube 100 corresponds, and a second position, more downstream with respect to the advance direction "A" and visible, for example, in FIG. 4, with which a completed cutting position of the tube 100 corresponds.

The distance between the end positions assumed by the movement means 8 is greater than the distance between the end positions reached by the cutting unit 2 and by the cutting-off device 5. In other words, the movement means 8 have a travel, along the longitudinal axis "X" of the tube, which is greater with respect to the cutting unit 2 and the cutting-off device 5.

Advantageously, the cutting-off device 5 is interposed between the cutting unit 2 and the movement means 8. Thus, the cutting-off device 5 is precisely at the section of the inner seam 200 exposed following the distancing action exerted by the movement means 8 on the length "S" just cut.

The cutting-off machine 1 further comprises a control unit (not shown) configured to manage operation of the different parts of the cutting-off machine 1.

Figure 2:
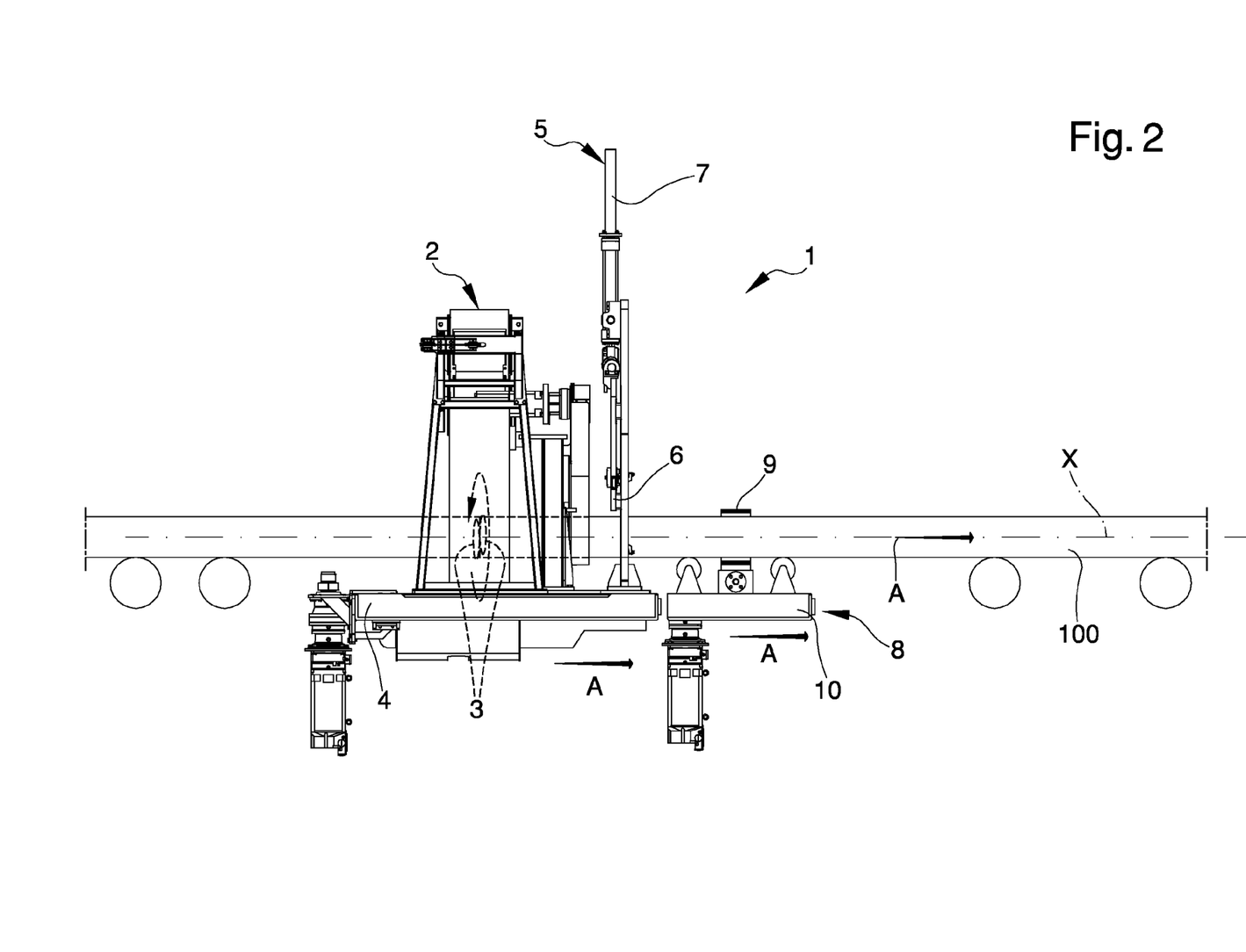

In particular, the control unit is configured to activate initially the cutting unit 2 on reaching a predetermined position of the tube along the longitudinal axis "X". The cutting unit 2 is activated both by activating translation of the trolley 4 and by activating, immediately or subsequently, the cutting tools 3 (FIG. 2).

Furthermore, the control unit is configured to perform the following operations in succession, after completion of cutting of the length "S" by the cutting unit 2:

activating movement means 8 to obtain stable gripping of the length "S" of the tube 100;

moving the movement means 8 by a pre-set travel away from the cutting unit 2 (achieving acceleration with respect to the speed of the cutting unit 2), and activating the cutting-off device 5 to cut the portion of the inner seam 200 exposed following distancing of the length "S".

According to an alternative embodiment, activation of the movement means 8 to grip stably the length "S" after completion of cutting of the length "S" by the cutting unit 2 may be substituted by activation of movement means 8 to grip stably a front portion of the tube 100 before cutting of the length "S" by the cutting unit 2. In this circumstance, the movement means 8 grip the tube 100 in its portion which will form the length "S" at the end of cutting and gripping remains stable until cutting of the inner seam 200.

In other words, rather than grip the length "S" of tube after cutting, it is possible, by means of the movement means 8 (clamps), to grip the front part of the tube 100 before cutting and, on completing cutting, maintain the length "S" of the tube 100 gripped and advance it to distance it from the remaining part of the tube 100.

Advantageously, the control unit sets an advance of the movement means 8 for a sufficient travel to allow a rear edge of the length "S" to overtake the cutting-off device 5 (and, in particular, to overtake the plane on which the blade 6 acts, which will therefore be positioned above the section of the inner seam 200 exposed). Subsequently to the moment when the rear edge of the length "S" overtakes the cutting-off device 5, the control unit maintains the movement means 8 at the same speed as the tube 100 or may continue to distance the length "S".

Subsequently to cutting of the inner seam 200, the movement means 8 (or alternatively further means not shown) conduct the length "S" (having inside it a length of the inner seam 200) towards a receiving station which sorts the length "S" or alternatively submits the length "S" to further processing.

Functioning of the cutting-off machine 1 with reference to FIGS. 1-5 is now described.

FIG. 1 shows the machine 1 immediately before cutting starts, wherein the tube 100 is inserted through the cutting unit 2, still inactive but already advancing in the same direction as advance direction "A" of the tube 100 together with the cutting-off device 5, which is inactive. The movement means 8 also advance at the same speed as the tube 100, but they are also inactive (the grips or pincers do not grip the tube 100). In this step, the cutting unit 2, the cutting-off device 5 and the movement means 8 move following the tube 100 at the same speed as the tube 100.

FIG. 2 shows activation of the cutting tools 3 of the cutting unit, which realises cutting of the tube 100 and therefore separation of the length "S".

FIG. 3 shows the subsequent step wherein, also with the system of following the tube, the movement means 8 tighten the grips or the pincers on the length "S" and are accelerated (direction of movement indicated with "AA" to identify a greater speed with respect to the cutting unit 2 and the cutting-off device 5) to distance the length "S" from the remaining part of the tube 100.

FIG. 4 shows activation of the cutting-off device 5, which cuts the exposed section of the inner seam 200 between length "S" and the remaining part of the tube 100, by means of guillotine descent of the blade 6.

Figure 5:
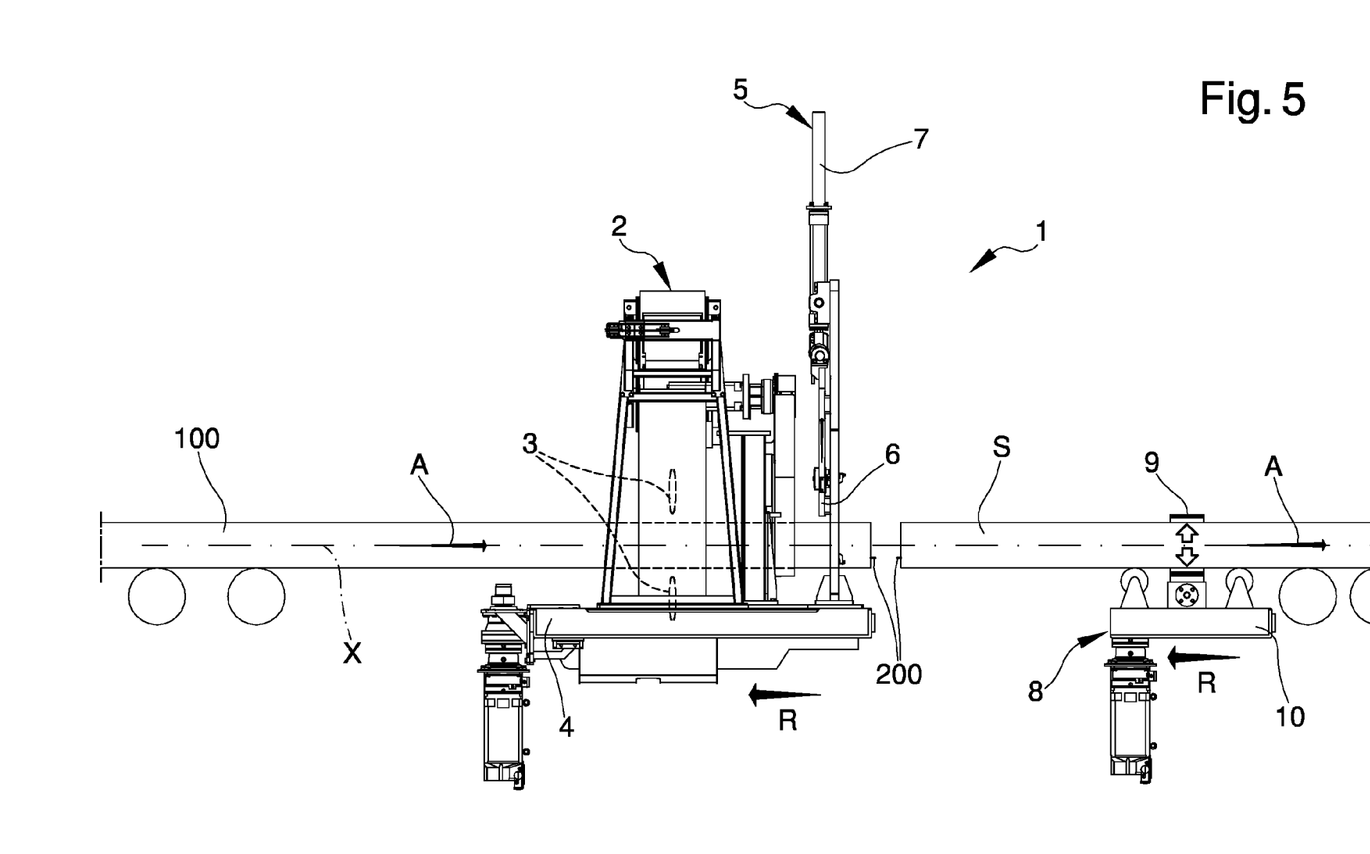

FIG. 5 shows the subsequent return step (direction "R") by the cutting unit 2, the cutting-off device 5 and the movement means 8 (whose pincers or grips have released the grip on the length "S", which continues to advance on the roller bed), which return to the initial position of FIG. 1 to start a new work cycle.

The present invention achieves the proposed objects, overcoming the disadvantages complained in the known art.

Configuration of the machine according to the invention allows, in fact, complete cutting of the tube (cutting of the length and subsequent cutting of the inner seam) in absolute safety and precision, since the movement means determine, at every moment and in a controlled way (for example by means of an advance curve imposed by the control unit) the position assumed by the length just cut. It is therefore possible to activate the cutting-off device on reaching an optimal configuration, particularly at the moment when the length has reached a safe distance from the tube and from the cutting-off device.

Consequently, the massive use of photocells of the prior art, With the related problems of reliability, may be avoided, obtaining a structure of the cutting-off machine which is simple and reliable.

The invention claimed is:

1. A cutting-off machine, comprising:
   a cutting unit (2) being enabled to receive a tube (100) and to cut the tube (100) according to a plane transversal to a longitudinal axis (X) of the tube (100);
   the cutting unit having at least a cutter being rotationally drivable about the tube to separate a first tube section from a second tube section, but not cut through an inner weld seam;
   movement means (8) enabled to grip stably a length (S) of cut tube (100) and move said length (S) away from the cutting unit (2) along a direction of advance (A) of the tube (100);
   a cutting-off device (5) interposed between said cutting unit (2) and said movement means (8) and configured to cut off the inner welding seam (200) floating inside said tube (100);
   the cutting off device and the cutting unit each respectively fixedly mounted to a carriage that moves along the direction of the tube during cutting.

2. The machine according to claim 1, wherein said cutting-off device (5) and said cutting unit (2) act along respective planes transversal to the longitudinal axis (X) of the tube (100).

3. The machine according to claim 1, further comprising a control unit configured to realise the following operations in succession:
   activate said movement means (8) to realise a stable grip of a length (S) of tube (100) cut from a continuous tube (100) by means of said cutting unit (2);
   move said movement means (8) by a pre-set travel away from the cutting unit (2) to distance the length (S) from the remaining part of the tube (100), and
   activate said cutting-off device (5) to realise cutting-off of an inner seam (200) present inside said length (S) and said remaining part of the tube (100) at a zone between said length (S) and said remaining part of the tube (100).

4. The machine according to claim 1, wherein said cutting-off device (5) comprises a blade (6) vertically movable according to a guillotine movement.

5. The machine according to claim 1, wherein said movement means (8) comprise a gripper or a vice, sliding mounted on a carriage (4) moveable forwards and backwards along the longitudinal axis (X) of the tube (100).

6. The machine according to claim 1, wherein said cutting-off device (5) is movable along a direction parallel to the longitudinal axis (X) of the tube (100) to operate with a tracking technique on the tube (100).

7. The machine according to claim 6, wherein said cutting unit (2) is movable along a direction parallel to the longitudinal axis (X) of the tube (100) to operate with a tracking technique on the tube (100), and wherein the cutting unit (2) and the cutting-off device (5) are solidly constrained to each other in the movement along said parallel direction to the longitudinal axis (X) of the tube (100).

8. (currenty amended) The machine according to claim 1, wherein said cutting unit (2) is the orbital type, presenting at least one cutting tool (3) movable along a trajectory which develops around the longitudinal axis (X) of the tube (100).

9. A method for cutting off a tube (100), comprising the following steps in the specific order indicated:
   prepare a tube (100) welded along the longitudinal welding line and presenting internally a welding seam (200) detached from said tube (100);
   separate a length (S) of tube from said tube (100) by means of cutting according to a transversal plane to the longitudinal axis (X) of the tube (100) using a cutting means including at least a cutter rotationally driven about the tube;

advance said length (S) away from the remaining part of the tube (100) along a direction (A) parallel to the longitudinal axis (X) of the tube (100) so as to expose a section of said inner seam (200);

cut off said inner seam (200) by means of a guillotine cutting-off device (5) mounted on the same carriage as the cutting means.

10. The method according to claim 9, wherein said step of advancing the length (S) away from the remaining part of the tube (100) is realised by advancing said length (S) by a sufficient travel to allow a back edge of the length (S) to go beyond said cutting-off device (5).

\* \* \* \* \*